US012507309B2

United States Patent
Cohen

(10) Patent No.: US 12,507,309 B2
(45) Date of Patent: Dec. 23, 2025

(54) REDIRECTION OF GTP TRAFFIC IN MOBILE NETWORKS

(71) Applicant: NOVELSAT LTD., Ra'anana (IL)

(72) Inventor: Eyal Cohen, Hod Hasharon (IL)

(73) Assignee: NOVELSAT LTD., Ra 'anana (IL)

( * ) Notice: Subject to any disclaimer, the term of this patent is extended or adjusted under 35 U.S.C. 154(b) by 306 days.

(21) Appl. No.: 18/016,462

(22) PCT Filed: Aug. 25, 2021

(86) PCT No.: PCT/IB2021/057777
§ 371 (c)(1),
(2) Date: Jan. 17, 2023

(87) PCT Pub. No.: WO2022/043883
PCT Pub. Date: Mar. 3, 2022

(65) Prior Publication Data
US 2023/0284326 A1    Sep. 7, 2023

Related U.S. Application Data

(60) Provisional application No. 63/072,244, filed on Aug. 31, 2020.

(51) Int. Cl.
*H04W 76/22* (2018.01)
(52) U.S. Cl.
CPC .................................. *H04W 76/22* (2018.02)
(58) Field of Classification Search
None
See application file for complete search history.

(56) References Cited

U.S. PATENT DOCUMENTS

| 8,438,298 | B2 * | 5/2013 | Arai | G06F 8/61 |
| | | | | 711/170 |
| 10,341,300 | B2 | 7/2019 | Grayson et al. | |
| 11,228,792 | B1 * | 1/2022 | Ram | H04L 65/80 |
| 2002/0144283 | A1 * | 10/2002 | Headings | H04N 21/47211 |
| | | | | 348/E7.063 |

(Continued)

FOREIGN PATENT DOCUMENTS

| EP | 3092835 B1 | 8/2020 |
| WO | 2015198303 A1 | 12/2015 |

OTHER PUBLICATIONS

ETSI GS NGP 001, "Group Specification—Next Generation Protocols (NGP); Scenario Definitions ," V1.3.1, European Telecommunications Standards Institute (ETSI), pp. 1-131, Jan. 2019.

(Continued)

*Primary Examiner* — Lonnie V Sweet
(74) *Attorney, Agent, or Firm* — FisherBroyles, LLP; Roger L. Browdy; James E. Mrose

(57) ABSTRACT

A method for content delivery includes, in an edge gateway (64) coupled to an access network, intercepting packets that are communicated over a network tunnel between a user device (24) and a core network (36) for delivering content from a remote content server to the user device. The network tunnel is redirected toward a local content server (60) coupled to the access network. The content is delivered to the user device from the local content server over the redirected network tunnel.

17 Claims, 2 Drawing Sheets

(56) References Cited

U.S. PATENT DOCUMENTS

| | | | |
|---|---|---|---|
| 2012/0173749 A1* | 7/2012 | Shah | H04L 65/765 709/231 |
| 2016/0192235 A1* | 6/2016 | Ahluwalia | H04B 7/18515 370/329 |
| 2017/0063783 A1* | 3/2017 | Yong | H04L 69/22 |
| 2017/0064751 A1* | 3/2017 | Sjödin | H04W 76/11 |
| 2018/0234346 A1* | 8/2018 | Liu | H04L 47/2483 |
| 2019/0116624 A1 | 4/2019 | Tandon et al. | |
| 2020/0007226 A1* | 1/2020 | Takagi | H04L 67/289 |
| 2020/0028896 A1* | 1/2020 | Veldanda | H04L 67/1014 |
| 2020/0213152 A1 | 7/2020 | Choquette et al. | |
| 2020/0229021 A1* | 7/2020 | Zheng | H04W 76/12 |
| 2022/0030060 A1* | 1/2022 | Jain | H04L 12/66 |

OTHER PUBLICATIONS

3GPP TS 32.298, "3rd Generation Partnership Project; Technical Specification Group Services and System Aspects; Telecommunication management; Charging management; Charging Data Record (CDR) parameter description (Release 15)," V15.11.0, Technical Specification, 3GPP Organizational Partners, pp. 1-233, year 2020.

EP Application 21860682.0 Search Report dated Aug. 13, 2024.

3GPP TS 29.060, "3rd Generation Partnership Project; Technical Specification Group Core Network and Terminals; General Packet Radio Service (GPRS); GPRS Tunnelling Protocol (GTP) across the Gn and Gp interface (Release 16)", V16.0.0, Technical Specification, pp. 1-195, Mar. 2020.

ETSI TS 129 281 , "Universal Mobile Telecommunications System (UMTS); LTE; 5G; General Packet Radio System (GPRS) Tunneling Protocol User Plane (GTPv1-U) (3GPP TS 29.281 version 15.7.0 Release 15)", V15.7.0, Technical Specification, pp. 1-35, Jan. 2020.

Rodrigues, "Towards Improvements in Resource Management for Content Delivery Networks," Ph.D. thesis, Center for Informatics, Federal University of Pernambuco, Brazil, pp. 1-117, year 2016.

International Application # PCT/IB2021/057777 Search Report dated Dec. 16, 2021.

* cited by examiner

REDIRECTION OF GTP TRAFFIC IN MOBILE NETWORKS

CROSS-REFERENCE TO RELATED APPLICATIONS

This application is U. S. national-phase of PCT application PCT/IB2021/057777, filed Aug. 25, 2021, which claims the benefit of U.S. Provisional Patent Application 63/072,244, filed Aug. 31, 2020. The disclosures of these related applications are incorporated herein by reference.

FIELD OF THE INVENTION

The present invention relates generally to communication networks, and particularly to methods and systems for content delivery to user devices over communication networks.

BACKGROUND OF THE INVENTION

Various terrestrial mobile communication networks, such as fourth generation (4G) and fifth generation (5G) cellular networks, are used for delivering content to user devices. A common delivery scheme uses the General Packet Radio Service (GPRS) Tunneling Protocol (GTP). GTP is specified, for example, in "$3^{rd}$ Generation Partnership Project; Technical Specification Group Core Network and Terminals; General Packet Radio Service (GPRS); GPRS Tunnelling Protocol (GTP) across the Gn and Gp interface (Release 17)", 3GPP TS 29.060, V17.0.0, March, 2021, which is incorporated herein by reference. The control-plane and user-plane of GTP are referred to as GTP-C and GTP-U, respectively.

SUMMARY OF THE INVENTION

An embodiment of the present invention that is described herein provides a method for content delivery including, in an edge gateway coupled to an access network, intercepting packets that are communicated over a network tunnel between a user device and a core network for delivering content from a remote content server to the user device. The network tunnel is redirected toward a local content server coupled to the access network. The content is delivered to the user device from the local content server over the redirected network tunnel.

In some embodiments, the network tunnel is a General Packet Radio Service (GPRS) Tunneling Protocol (GTP) tunnel. In an embodiment, the content includes streaming video.

In some embodiments, the method further includes verifying whether the intercepted packets meet a redirection criterion, and redirecting the network tunnel only when the intercepted packets meet the redirection criterion. In an example embodiment, the intercepted packets include respective inner packets encapsulated with respective tunnel headers, and verifying whether the intercepted packets meet the redirection criterion includes applying the redirection criterion to one of more fields of the inner packets. In disclosed embodiments, the one or more fields include one or more of (i) destination Internet Protocol (IP) addresses, (ii) port numbers and (iii) Uniform Resource Locations (URLs) specified in the inner packets.

In some embodiments, the intercepted packets include respective inner packets encapsulated with respective tunnel headers, and redirecting the network tunnel includes terminating the network tunnel at the edge gateway and exchanging the inner packets with the local content server. In an embodiment, redirecting the network tunnel includes saving one or more tunnel identifiers of the network tunnel, and reusing the one or more tunnel identifiers in communicating over the redirected network tunnel.

In a disclosed embodiment, the content is provided to the local content server over a satellite network. In another embodiment, the content is provided to the local content server over the core network. In some embodiments, delivering the content from the local content server includes transcoding the content, by the local content server, from a first coding rate to a second coding rate.

There is additionally provided, in accordance with an embodiment of the present invention, an edge gateway including one or more interfaces and packet processing circuitry. The one or more interfaces are configured for communicating with an access network, with a core network and with a local content server. The packet processing circuitry is configured to intercept packets that are communicated over a network tunnel between a user device and the core network for delivering content from a remote content server to the user device, to redirect the network tunnel toward the local content server, and to deliver the content to the user device from the local content server over the redirected network tunnel.

The present invention will be more fully understood from the following detailed description of the embodiments thereof, taken together with the drawings in which:

DETAILED DESCRIPTION OF EMBODIMENTS

Overview

Figure 1:
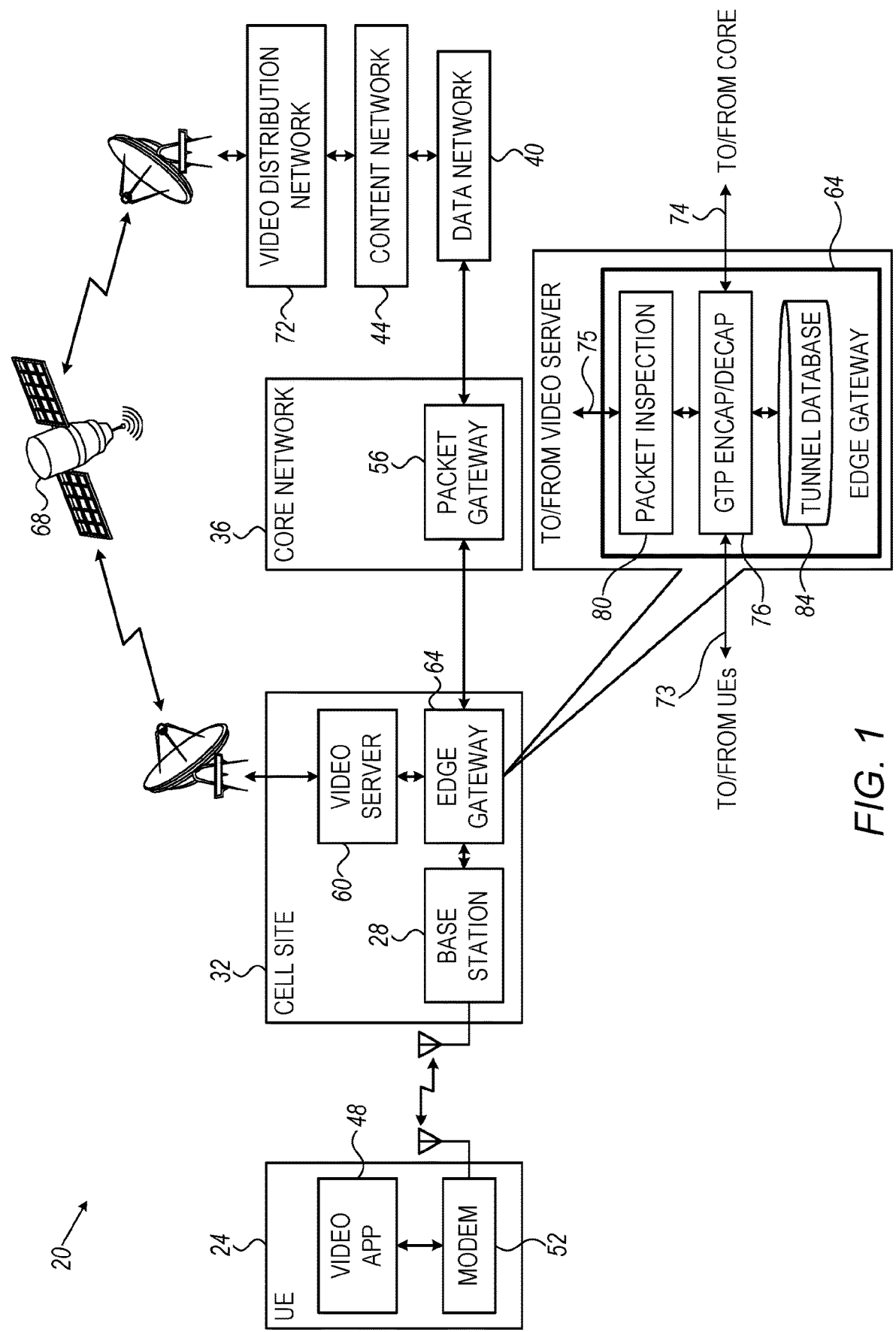
FIG. 1 is a block diagram that schematically illustrates a system for delivering video to user devices using GTP redirection, in accordance with an embodiment of the present invention.

A typical terrestrial communication network comprises an access network and a core network. The access network comprises multiple base stations that communicate with user devices over a wireless channel. The core network may be connected to various networks and service-provider platforms, e.g., over the Internet.

Some communication networks deliver content, e.g., streaming video, to user devices over GTP tunnels. Typically, a GTP tunnel is established at the request of a user device, and is terminated in the user device at one end and in the core network at the other end. The packets communicated in a GTP tunnel typically comprise "inner packets" of some underlying protocol (e.g., UDP, TCP or HTTP) that are encapsulated with GTP headers.

In practice, a busy base station may be required to handle on the order of hundreds of GTP tunnels simultaneously, each tunnel conveying a bandwidth up to 20 Mbps and sometimes more. This is the case, for example, in applications that deliver on-line television channels over a cellular network. An aggregate bandwidth of this size may exceed the capacity of elements of the backhaul and/or core network. Consequently, users may experience high latency, degraded video quality and overall poor user experience.

Embodiments of the present invention that are described herein provide improved methods and systems for delivering content to user devices. The disclosed techniques involve redirecting selected GTP tunnels toward a local content server that is coupled to the access network, e.g., collocated with the base station, and serving content to user devices from the local content server instead of via the core network.

In some disclosed embodiments, an edge gateway and a local content server are coupled to a base station, e.g., between the base station and a backhaul link that connects the base station to the core network. The edge gateway intercepts packets belonging to GTP tunnels that pass through the base station, between user devices and the core network. The edge gateway is typically pre-programmed with a "redirection criterion" that specifies which GTP tunnels should be redirected and which should not. The redirection criterion is typically specified in terms of attributes of the underlying protocol, e.g., in terms of destination IP addresses, port numbers and/or Uniform Resource Locators (URLs).

The edge gateway inspects the intercepted packets, and, upon identifying a GTP tunnel whose packets meet a redirection criterion, redirects the GTP tunnel to the local content server. From that point, content is served to the user device over the redirected GTP tunnel, from the local content server. This technique relieves the load on the backhaul and core networks. As a result, user devices served by the base station (by redirected tunnels or otherwise) experience smaller latency, higher throughput and better user experience. Redirection of a GTP tunnel is typically transparent to the user device.

In various embodiments, the redirection criterion can be simple or elaborate, fixed or time-varying. One example criterion is a list destination IP addresses and/or URLs that should be redirected. A more elaborate redirection criterion may also consider parameters such as the current load on the base station, the time of day, requirements of specific user devices, or other relevant information.

When using the disclosed technique, an underlying assumption is that the local content server possesses the appropriate content for serving to the user devices. In various embodiments, the local content server may obtain the content in various ways. In an example embodiment, the local content server receives the content from a satellite communication network, possibly in real time. This mode of delivery bypasses the core network entirely. In another embodiment, the local content server receives the content via the core network. Although this mode of delivery does not bypass the core network, performance can still be enhanced, e.g., by transferring only one copy of the content over the core network, for use in multiple GTP tunnels for multiple user devices. In either delivery mode, the local content server may perform transcoding locally, to suit different rate requirements of different user devices.

System Description

FIG. 1 is a block diagram that schematically illustrates a system 20 for delivering video to user devices using GTP redirection, in accordance with an embodiment of the present invention. The embodiments described herein refer mainly to video delivery, by way of example. In alternative embodiments, the disclosed techniques can be used to deliver any other suitable type of content.

In some embodiments system 20 comprises multiple user devices 24 (also referred to as User Equipment—UEs) and multiple base stations 28. Each base station 28 typically serves a plurality of UEs 24. A given UE 24 may comprise, for example, a smartphone, a mobile computer, or any other suitable device capable of communicating and consuming content. The figure focuses on a single base station and a single UE, for the sake of clarity. Base station 28 is located at a cell site 32. Base stations 28 are connected to a core network 36 via a suitable backhaul network.

Core network 36 may be connected to various networks such as the Internet, to service-provider platforms, application servers, content servers and the like, for providing various services to UEs 24. In the present example, a content network 44 provides content via a data network 40 to core network 36, for serving to UEs 24.

In the embodiment of FIG. 1, content network 44 produces on-line video content, e.g., a plurality of on-line television channels, for serving to UEs 24. Network 44 typically comprises one or more suitable video servers (referred to as "remote video servers" or "remote content servers") for this purpose.

UE 24 comprises a video application ("app") 48, e.g., a video player, which is configured to communicate with a video server for requesting and consuming video content. UE 24 further comprises a modem 52 for communicating with base station 28.

In various embodiments, system 20 may operate in accordance with various mobile communication standards or protocols. In one example, system 20 operates in accordance with a $4^{th}$-generation (4G) standard such as Long-Term Evolution (LTE). In another example, system 20 operates in accordance with a $5^{th}$-generation (5G) standard.

Typically, video app 48 in UE 24 obtains the video content over a GTP tunnel. The packets communicated via the GTP tunnel typically comprise "inner packets" of some underlying protocol (e.g., UDP, TCP or HTTP) that are encapsulated with GTP headers. At each end ("termination point") of the tunnel, inner packets are encapsulated with GTP headers and transmitted to the other end. Packets received from the other end are de-capsulated, i.e., stripped off the GTP headers, and the resulting inner packets are sent to their destination. In the example of FIG. 1, the GTP tunnel is terminated at one end in UE 24, and at the other end in a packet gateway 56 in core network 36 (as is common in 4G architectures). In an example 5G implementation, the GTP tunnel may terminate on the core-network side in a User Plane Function (UPF).

In some embodiments, system 20 further comprises a local video server 60 and an edge gateway 64, which are configured to serve video content to UE 24 using the disclosed GTP tunnel redirection techniques. Video server 60 is "local" from the perspective of base station 28, or more generally from the perspective of the access network. This is in contrast to the "remote video server" in content network 44. Local video server 60 is also referred to as a "local content server". The operation of video server 60 and edge gateway 64 is described in detail below.

An inset at the bottom of FIG. 1 shows the internal structure of edge gateway 64, in accordance with an embodiment of the present invention. Edge gateway 64 comprises a GTP termination module 76 (also referred to as "GTP encapsulator/decapsulator"), a packet inspection module 80, and a tunnel database 84 stored in a suitable memory. Edge gateway 64 is connected to base station 28 via an interface 73 and to the backhaul network via an interface 74, for communicating packets with UEs 24 and with core network 36, respectively. Gateway 64 further comprises an interface 75 for communicating with local video server 60.

In the example of FIG. 1, local video server 60 obtains the video content in real-time via a satellite network. In this example, content network 44 sends the video content to a video distribution network 72, which in turn transmits the video content via a satellite 68 to video server 60. In alternative embodiments, the satellite network may be omitted and server 60 may obtain the video content using other means, e.g., via core network 36 or via another terrestrial network.

The configurations of system 20 and its components, as illustrated in FIG. 1, are example configurations that are shown purely for the sake of conceptual clarity. Any other suitable configurations can be used in alternative embodiments. For example, when system 20 comprises multiple base stations 28, a respective video server 60 and a respective edge gateway 64 may be coupled to each base station, or to selected base stations. In some embodiments, a given video server 60 and/or a given edge gateway 64 may serve multiple base stations 28. In some embodiments, video server 60 and/or edge gateway 64 need not necessarily be collocated at cell site 32. Video server 60 and edge gateway 64 may be coupled to the access network of system 20, physically and/or logically, in any other suitable way.

As another example, the internal structure of edge gateway 64 may differ from the configuration shown in FIG. 1. In the present context, GTP encapsulator/decapsulator 76 and packet inspection module 80 are referred to collectively as "packet processing circuitry". In alternative embodiments, the packet processing circuitry may have any other suitable configuration.

The different components of system 20 may be implemented using suitable hardware, such as in one or more Application-Specific Integrated Circuits (ASICs) or Field-Programmable Gate Arrays (FPGAs), using software, or using a combination of hardware and software elements.

Certain elements of system 20, e.g., certain elements of video server 60 and/or edge gateway 64, may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

GTP Tunnel Redirection

Figure 2:
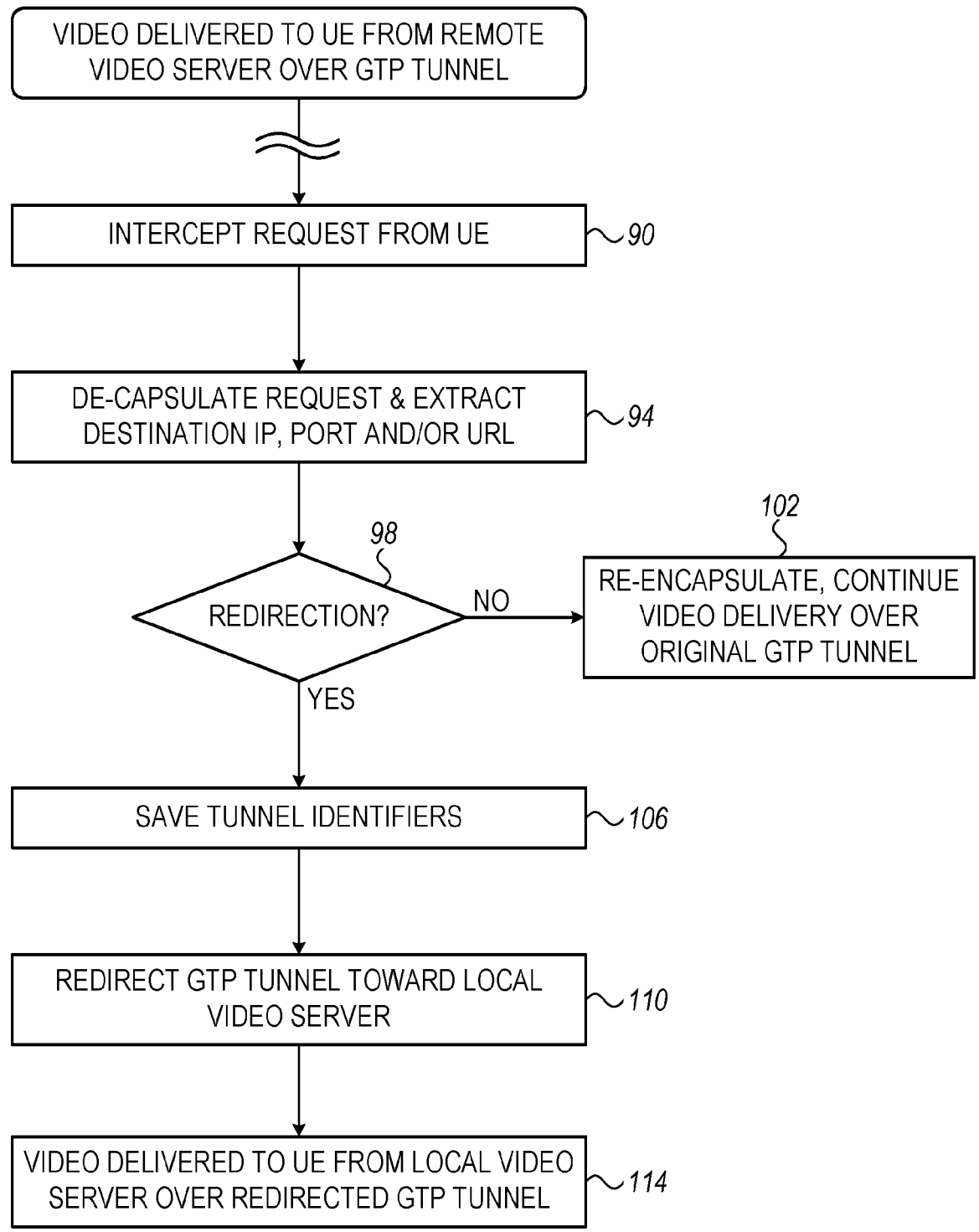
FIG. 2 is a flow chart that schematically illustrates a method for video delivery to user devices using GTP redirection, in accordance with an embodiment of the present invention.

FIG. 2 is a flow chart that schematically illustrates a method for video delivery to user devices using GTP redirection, in accordance with an embodiment of the present invention. The method is carried out by edge gateway 64. For simplicity of explanation, the description below refers to a single UE served by a single GTP tunnel. In real-life scenarios, edge gateway 64 typically applies such a process in parallel to multiple UEs and multiple tunnels.

At the time the method begins, a GTP tunnel is already established between UE 24 and core network 36, for delivering video to the UE from a remote video server in content network 44.

At a certain point in time, edge gateway 64 intercepts a request from UE 24 for subsequent video content, at an interception stage 90. The request may originate, for example, from video app 48 in UE 24, requesting the next video segment in a video being viewed or buffered. In accordance with GTP, the intercepted request comprises an inner packet (e.g., an HTTP or TCP request) encapsulated with a GTP header.

At an inspection stage 94, GTP encapsulator/decapsulator 76 decapsulates the intercepted request, and inspection module 80 extracts suitable parameters from the decapsulated inner packet. The extracted parameters may comprise, for example, a destination IP address, a port number and/or a URL specified in the request.

At a redirection checking stage 98, packet inspection module 80 checks whether the GTP tunnel in question is to be redirected or not. To this end, module 80 checks whether the parameter or parameters extracted from the request (e.g., destination IP address, port and/or URL) meet the redirection criterion.

If the redirection criterion is not met, module 76 re-encapsulates the packet, at a no-redirection stage 102. In this case, video delivery continues via the original GTP tunnel, over core network 36.

If the redirection criterion is met, edge gateway 64 begins a process of redirecting the GTP tunnel toward local video server 60. At an identifier storage stage 106, inspection module 80 saves one or more tunnel identifiers of the GTP tunnel (e.g., the Tunnel Endpoint Identifier—TEID—of packet gateway 56), source and destination MAC addresses, and/or source and destination IP addresses, in database 84. At a redirection stage 110, edge gateway 64 redirects the tunnel toward local video server 60.

Redirecting the tunnel typically involves (i) terminating the tunnel in edge gateway 64, e.g., in module 76, and (ii) replacing tunnel identifiers in the GTP headers with tunnel identifiers of the redirected tunnel. Replaced parameters may comprise TEID, IP addresses, MAC addresses and the like. Typically, the redirection operation is on-going, in the sense that gateway 64 replaces parameters of packets when forwarding them to and from video server 60.

In one example, the original packets exchanged between gateway 64 and UE 24 have the following parameters (referred to as "original parameters"):
Source MAC address: A MAC address of UE 24.
Destination MAC address: A MAC address belonging to the core network, e.g., a MAC address of the next-hop router in the core network.
Source IP address in inner packet: An IP address of UE 24.
Destination IP address in inner packet: An IP address of the remote video server in content network 44.

In this example, the de-capsulated and redirected packets exchanged between gateway 64 and local video server 60 have the following parameters (referred to as "redirected parameters"):
Source MAC address: A MAC address of gateway 64.
Destination MAC address: A MAC address of local video server 60.
Source IP address: An IP address of UE 24.
Destination IP address: An IP address of local video server 60.

At a video delivery stage 114, local video server 60 provides video content for serving to UE 24, and gateway 64 delivers the video content to UE 24 over the redirected GTP tunnel. As part of the redirection operation, gateway 64 encapsulates the packets arriving from server 60 with GTP headers, replaces the redirected parameters with the original parameters, and sends the packets to UE 24. In the opposite direction, gateway 64 de-capsulates the packets arriving from UE 24, replaces the original parameters with the redirected parameters, and sends the packets to server 60.

Gateway 64 typically replaces the parameters above using the information that was stored in database 84 at stage 106. For example, each GTP tunnel is typically assigned one or more TEID's during tunnel establishment (e.g., one TEID for the UE-to-core request session and another TED for the core-to-UE response session, both belonging to the same tunnel). When replacing the parameters, gateway 64 typically ensures that the packet sent to the UE comprises the original core-to-UE TEID.

The flow of FIG. 2 is an example flow that is depicted purely for the sake of conceptual clarity. In alternative embodiments, any other suitable flow can be used for implementing the disclosed techniques.

For example, in some embodiments, local video server 60 performs transcoding from one video coding rate to another when delivering video content. In an example embodiment, video server 60 receives a single version of a certain video (e.g., television channel) at a single coding rate (a single compression rate, typically the highest-quality, highest-bandwidth rate). The single version can be received via the satellite network or via core network 36, as discussed above. When delivering this video to UEs 24, different UEs may request the video at different video coding rates, e.g., depending on the channel conditions of each UE. In order to reuse the single copy (and eliminate the need to obtain multiple copies of the same video at different coding rates), server 60 may transcode the video to match the coding rate required by each UE.

Although the embodiments described herein mainly address video delivery over mobile networks, the methods and systems described herein can also be used in other applications, such as in video delivery over Wireless Local-Area Networks (WLANs), video delivery over fixed wireless access and video delivery for aero and maritime platforms.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for content delivery, comprising:
   in an edge gateway coupled to an access network, intercepting packets that are communicated over a network tunnel between a user device and a core network for delivering content from a remote content server to the user device;
   redirecting the network tunnel toward a local content server coupled to the access network;
   delivering the content to the user device from the local content server over the redirected network tunnel; and
   verifying whether the intercepted packets meet a redirection criterion, and redirecting the network tunnel only when the intercepted packets meet the redirection criterion;
   wherein the redirection criterion comprises parameters including current load on the base station, time of day and requirements of specific user devices.

2. The method according to claim 1, wherein the network tunnel is a General Packet Radio Service (GPRS) Tunneling Protocol (GTP) tunnel.

3. The method according to claim 1, wherein the content comprises streaming video.

4. The method according to claim 1, wherein the intercepted packets comprise respective inner packets encapsulated with respective tunnel headers, and wherein verifying whether the intercepted packets meet the redirection criterion comprises applying the redirection criterion to one or more fields of the inner packets.

5. The method according to claim 4, wherein the one or more fields comprise one or more of (i) destination Internet Protocol (IP) addresses, (ii) port numbers and (iii) Uniform Resource Locations (URLs) specified in the inner packets.

6. The method according to claim 1, wherein the intercepted packets comprise respective inner packets encapsulated with respective tunnel headers, and wherein redirecting the network tunnel comprises terminating the network tunnel at the edge gateway and exchanging the inner packets with the local content server.

7. The method according to claim 1, wherein redirecting the network tunnel comprises saving one or more tunnel identifiers of the network tunnel, and reusing the one or more tunnel identifiers in communicating over the redirected network tunnel.

8. The method according to claim 1, and comprising providing the content to the local content server over a satellite network.

9. The method according to claim 1, and comprising providing the content to the local content server over the core network.

10. The method according to claim 1, wherein delivering the content from the local content server comprises transcoding the content, by the local content server, from a first coding rate to a second coding rate.

11. An edge gateway, comprising:
    one or more interfaces for communicating with an access network, with a core network and with a local content server; and
    packet processing circuitry, configured to intercept packets that are communicated over a network tunnel between a user device and the core network for delivering content from a remote content server to the user device, to redirect the network tunnel toward the local content server, and to deliver the content to the user device from the local content server over the redirected network tunnel;
    wherein the packet processing circuitry is further configured to verify whether the intercepted packets meet a redirection criterion, and to redirect the network tunnel only when the intercepted packets meet the redirection criterion;
    wherein the redirection criterion comprises parameters including current load on the base station, time of day and requirements of specific user devices.

12. The edge gateway according to claim 11, wherein the network tunnel is a General Packet Radio Service (GPRS) Tunneling Protocol (GTP) tunnel.

13. The edge gateway according to claim 11, wherein the content comprises streaming video.

14. The edge gateway according to claim 11, wherein the intercepted packets comprise respective inner packets encapsulated with respective tunnel headers, and wherein the packet processing circuitry is configured to verify whether the intercepted packets meet the redirection criterion by applying the redirection criterion to one or more fields of the inner packets.

15. The edge gateway according to claim 14, wherein the one or more fields comprise one or more of (i) destination Internet Protocol (IP) addresses, (ii) port numbers and (iii) Uniform Resource Locations (URLs) specified in the inner packets.

16. The edge gateway according to claim 11, wherein the intercepted packets comprise respective inner packets encapsulated with respective tunnel headers, and wherein the packet processing circuitry is configured to terminate the network tunnel at the edge gateway and to exchange the inner packets with the local content server.

17. The edge gateway according to claim 11, wherein the packet processing circuitry is configured to save one or more tunnel identifiers of the network tunnel, and to reuse the one or more tunnel identifiers in communicating over the redirected network tunnel.

* * * * *